US008762592B2

(12) United States Patent
Farkas et al.

(10) Patent No.: US 8,762,592 B2
(45) Date of Patent: Jun. 24, 2014

(54) SYSTEM AND METHOD FOR AUTOMATIC MODULE SELECTION

(75) Inventors: Sandor Farkas, Round Rock, TX (US); John S. Loffink, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1314 days.

(21) Appl. No.: 11/468,622

(22) Filed: Aug. 30, 2006

(65) Prior Publication Data
US 2008/0126630 A1 May 29, 2008

(51) Int. Cl.
G06F 3/00 (2006.01)

(52) U.S. Cl.
USPC .............................. 710/16; 710/110

(58) Field of Classification Search
USPC ........... 710/8–10, 15–18, 300–304, 104, 110, 710/122; 713/1, 2, 100
See application file for complete search history.

(56) References Cited

U.S. PATENT DOCUMENTS

| 4,905,182 | A | * | 2/1990 | Fitch et al. ..................... 710/301 |
| 4,964,038 | A | * | 10/1990 | Louis et al. ........................ 710/9 |
| 4,992,976 | A | * | 2/1991 | Yonekura et al. ................ 710/10 |
| 5,105,421 | A | * | 4/1992 | Gingell .......................... 370/363 |
| 5,581,787 | A | * | 12/1996 | Saeki et al. ......................... 710/9 |
| 5,649,233 | A | * | 7/1997 | Chen ................................. 710/8 |
| 5,983,288 | A | * | 11/1999 | Visee ............................... 710/16 |
| 6,016,518 | A | * | 1/2000 | Matsushima et al. ............. 710/8 |
| 6,438,625 | B1 | * | 8/2002 | Olson ................................ 710/9 |
| 6,738,812 | B1 | | 5/2004 | Hara et al. |
| 6,779,068 | B2 | * | 8/2004 | Kim ............................... 710/303 |
| 6,889,248 | B1 | | 5/2005 | Scheer |
| 6,889,338 | B2 | | 5/2005 | Srinivasan et al. |
| 6,941,350 | B1 | | 9/2005 | Frazier et al. |
| 7,035,954 | B1 | * | 4/2006 | Duran ........................... 710/302 |
| 7,307,456 | B2 | * | 12/2007 | Yu et al. ........................... 326/89 |
| 7,478,177 | B2 | * | 1/2009 | Cherian et al. ..................... 710/9 |
| 7,716,386 | B1 | * | 5/2010 | Vasquez et al. ................. 710/19 |
| 2003/0105904 | A1 | * | 6/2003 | Abbondanzio et al. ....... 710/302 |
| 2004/0024831 | A1 | | 2/2004 | Yang et al. |
| 2004/0215854 | A1 | * | 10/2004 | Kasperson et al. ........... 710/104 |
| 2005/0259642 | A1 | * | 11/2005 | Yang et al. .................... 370/376 |
| 2006/0026325 | A1 | * | 2/2006 | Huang et al. .................. 710/302 |
| 2006/0053216 | A1 | | 3/2006 | Deokar et al. |
| 2006/0143343 | A1 | * | 6/2006 | Isemura et al. ............... 710/104 |
| 2006/0218326 | A1 | * | 9/2006 | Tanaka ........................... 710/104 |
| 2006/0294261 | A1 | * | 12/2006 | Nordstrom et al. ............... 710/3 |
| 2008/0126582 | A1 | * | 5/2008 | Holland et al. .................... 710/6 |

OTHER PUBLICATIONS

Resistor Ladder <http://en.wikipedia.org/wiki/Resistor_ladder>, accessed on Sep. 10, 2010.*

* cited by examiner

Primary Examiner — Khanh Dang
(74) Attorney, Agent, or Firm — Baker Botts L.L.P.

(57) ABSTRACT

A selecting device that receives a digital connector ID signal and that generates a device output signal, the connector ID signal being representative of a connector ID for a connector that receives a server module, the device output signal being indicative of whether the server module is selected as a master server. Generating a signal indicative of an information handling system module rank includes generating a connector ID signal when a module is coupled to a chassis connector having a connector ID associated therewith, the connector ID signal being representative of the connector ID, receiving the connector ID signal at a selecting device, and generating a device output signal using the selecting device, the device output signal being indicative of a module rank.

18 Claims, 3 Drawing Sheets

SYSTEM AND METHOD FOR AUTOMATIC MODULE SELECTION

BACKGROUND

1. Technical Field

The present disclosure generally relates to information handling systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

The following presents a general summary of several embodiments of the disclosure in order to provide a basic understanding of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

In one embodiment, an information handling system is disclosed. The system includes a module adapted for selective connection to a chassis at a connector, the connector having a connector identifier (ID) associated therewith and a selecting device that receives a connector ID signal representative of the connector ID and that generates a device output signal, the device output signal being indicative of a module rank.

In another embodiment, an information handling system includes a selecting device that receives a digital connector ID signal and generates a device output signal, the connector ID signal being representative of a connector ID for a connector that receives a server module, the device output signal being indicative of whether the server module is selected as a master server.

Another embodiment of the disclosure is a method for generating a signal indicative of an information handling system module rank, the method including generating a connector ID signal when a module is coupled to a chassis connector having a connector ID associated therewith, the connector ID signal being representative of the connector ID, receiving the connector ID signal at a selecting device and generating a device output signal using the selecting device, the device output signal being indicative of a module rank.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DESCRIPTION OF EXEMPLARY EMBODIMENTS

For purposes of this disclosure, an information handling system may include, but is not limited to, any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
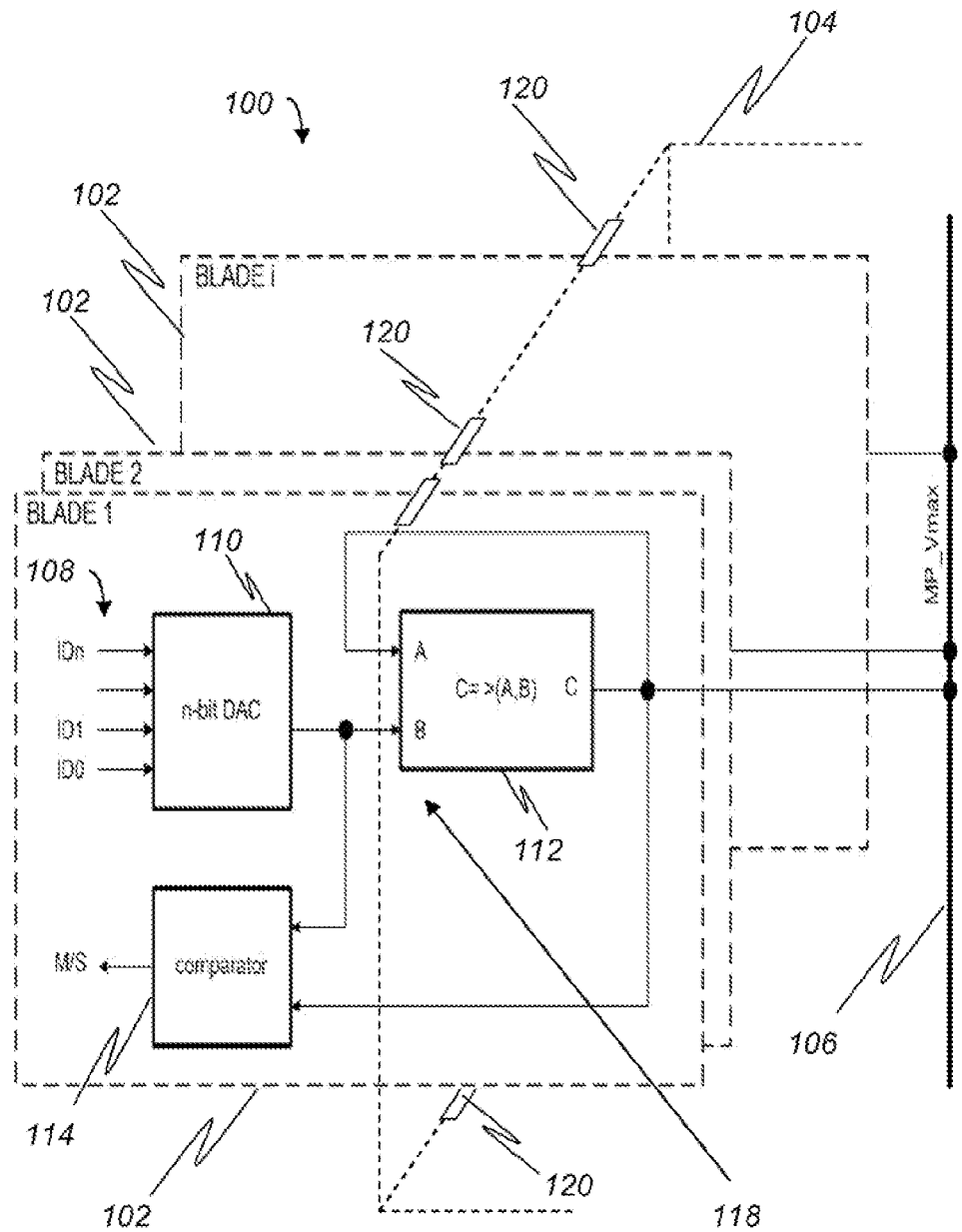
FIG. 1 is a block diagram to illustrate a non-limiting example of an information handling system according to the disclosure.

FIG. 1 schematically illustrates a non-limiting example of an information handling system 100. The information handling system 100 includes a chassis 104 housing modular components or modules 102. As a non-limiting example, the modules may include components such as network servers, memory cards, switching circuits or other components suitable for modular connection and/or disconnection to a chassis.

The information handling system may include any number of modules 102 depending upon the desired functionality and size of the system. The expandable number "i" of modules is noted in FIG. 1 as BLADE 1 BLADE 2, and so on to BLADE i. In one non-limiting embodiment, the modules comprise a number i of server modules. In one aspect, the server modules may include a number of blade servers.

Continuing with FIG. 1, the chassis 104 includes a node 106, which may be a common conductor or bus providing electrical connection among the several modules 102. Each module 102, when coupled to the chassis 104, is placed in electrical contact with the node 106, and the node 106 is electrically in common with any other module 102, which may be coupled to the node 106 via the chassis 104. In one non-limiting example, the node 106 may be a chassis midplane or backplane. In one non-limiting aspect, the chassis may further include a power supply, one or more cooling fans, a controller, and input/output ports for connecting I/O devices to the chassis, one or more switches and/or one or more additional ports for receiving other modules, such as a switch blade or other modules.

The chassis 104 may include connectors 120 for receiving the modules 102. In one non-limiting embodiment, the chassis connectors may include several chassis slots. In one aspect the modules 102 are interchangeable among the connectors 120, meaning that each module 102 may be inserted into any connector 120 in the chassis 104. Each chassis connector 120 in the example shown has associated therewith a connector ID uniquely identifying each connector 120 that receives a module 102. The connector ID may be generated using a number of electrical contacts, each electrical contact having a voltage state during operation. The electrical contacts may be used, for example, to generate a binary indicator at each connector. In one non-limiting example, the electrical contacts 108 shown may be used to generate any number of connector IDs. FIG. 1 shows a number "n" of ID electrical contacts 108 marked as ID0, ID1 and on to IDn. Each of these electrical contacts represents a binary bit, which IDs together form the connector ID. Any module 102 coupled to the chassis 104 will have an associated connector ID.

Continuing with the example shown in FIG. 1, a selecting device 118 is used to automatically select a module based in part on the connector ID and the relative location of the module 102 with respect to any other module 102 coupled to the chassis 104. In one non-limiting embodiment, the selecting device 118 comprises a first circuit 110 that receives the connector ID signal and generates a signal indicative of the connector ID. In one non-limiting embodiment, the first circuit 110 includes a digital-to-analog converter (DAC). A DAC may be used to convert each connector ID to a voltage level unique to the connector 120. The sensing device 118 may further include a buffer 112 that may be used to condition and amplify the DAC output signal to a desired level. In one non-limiting aspect, the DAC output signal is applied to the node 106 when the connector ID meets a ranking criterion. In the non-limiting embodiment shown in FIG. 1, the selecting device 118 further includes a second circuit 114, such as a comparator, used to compare the DAC output signal to a reference signal for dynamically determining whether a module 102 that is connected to a connector 120 having a rank greater than the rank of any other connector 120 having a module 102 connected thereto. The comparator 114 may generate a signal 116 that represents whether the module 102 is selected or ranked higher than any other module 102. In one non-limiting embodiment, the reference signal includes the buffer 112 output signal.

In several non-limiting example embodiments, the selecting device 118 may rank the connector ID from lowest to highest, from highest to lowest or in some other selected order. In one non-limiting embodiment, the module 102 connected to the chassis 104 via the connector 120 having the largest connector ID is automatically asserted as the selected module. In another non-limiting embodiment, the module 102 connected to the chassis 104 via the connector 120 having the lowest connector ID is automatically asserted as the selected module.

It is evident from the examples provided that the module selection is a dynamic selection in that the selected module may be deselected as soon as another module is connected to a connector having a higher ranking connector ID. The same is true when a previously selected module is removed thereby causing another module residing on the next highest ranking connector to automatically become the selected module.

In one non-limiting embodiment, the modules 102 comprise server modules, the chassis 104 comprises a rack and each connector comprises a slot connector or slot. Where the several server modules operate in a master/slave relationship, the servers may operate using the example embodiment to self assert whether the particular server is a master server or a slave server based on the module relative location with respect to any other server inserted into the rack via the slot connector. Each of the server modules 102 includes a substantially similar selecting device such as the DAC 110, buffer 112 and comparator 114. In this manner, each server module may dynamically assert a signal onto a midplane 106. If a particular server resides in a slot ranking above all other servers, then the comparator output indicates the rank and provides the signal 116 used to assert whether the server is to be a master server or a slave server.

Figure 2:
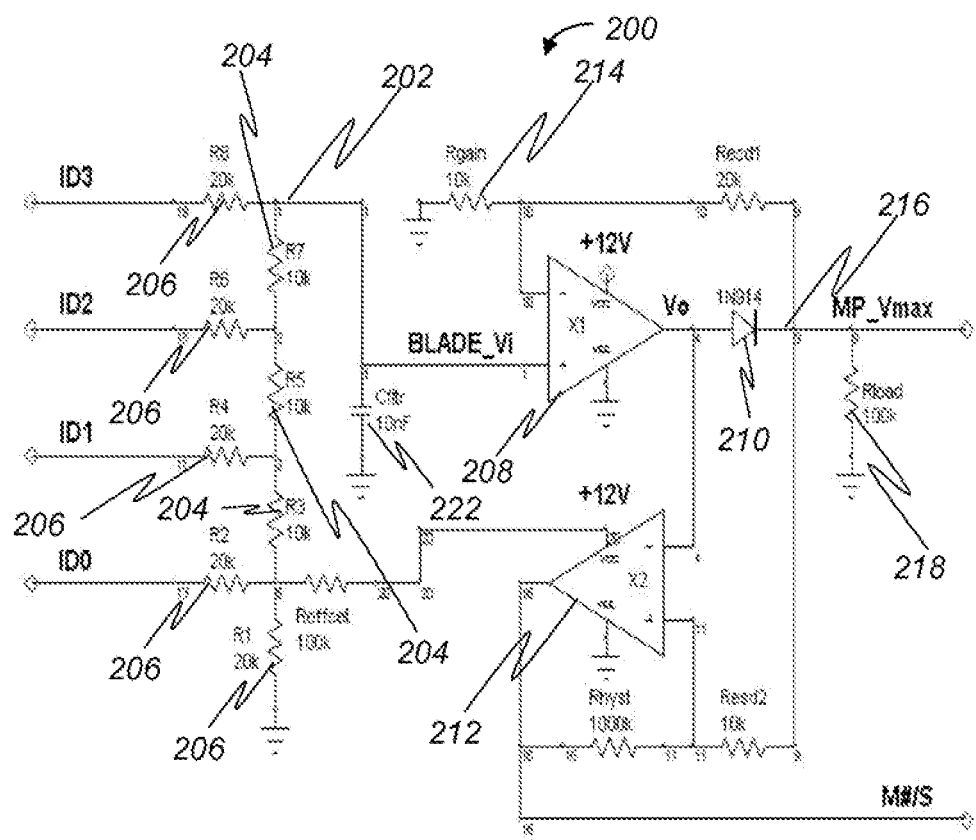
FIG. 2 schematically illustrates a non-limiting example of a selecting device according to the disclosure.

FIG. 2 illustrates one non-limiting example of a selecting device 200. The selecting device 200 illustrated includes an R-2R ladder DAC circuit 202 that receives a 4-bit connector ID signal. As noted above, the connector ID may include any desired number of bits, and the DAC 202 may be any suitable n-bit DAC and need not be an R-2R ladder. For illustrative purposes, the R-2R ladder 202 may be constructed using any suitable resistor network or any other components arranged to form a DAC. In the non-limiting example shown, the R-2R ladder is constructed using 10K-ohm resistors 204 for R3, R5 and R7, and 20K-ohm resistors 206 for resistors R1, R2, R4, R6 and R8.

The R-2R ladder 202 is coupled to an amplifier 208. The amplifier 208 output is coupled to a diode 210 and to an input of a comparator 212. The amplifier 208 has a gain resistor 214 for setting a gain for the amplifier 208.

The diode 210 has a forward bias output 216 that is coupled to the node 106 across a load resistor 218. The diode output 216 is further coupled to an input of the comparator 212. In one non-limiting embodiment, the diode coupling and resistive feedback denoted by Resd1 and Resd2 provides electrostatic discharge tolerance for hot plug and the operational amplifier output is short circuit protected.

In operation, the non-limiting example selecting device 200 of FIG. 2 uses the connector ID to generate a local voltage level indicated in FIG. 2 as BLADE_Vi for each module coupled to the chassis. Voltage Blade_Vi is applied to a wired-OR midplane (MP) net through an active diode OR circuit. The comparator 212 produces a signal indicating whether the diode 210 is either forward biased or reversed biased. In one non-limiting embodiment, a forward biased diode 210 indicates that the module is selected. In one embodiment, the module comprises a blade server and the blade server is asserted as a master server when the diode 210 is forward biased. The selecting device 200 of the example may be used to provide real time master/slave status when server blades are added, removed or moved to another connector.

While numerous changes may be made to the example provided, operation of the non-limiting example of FIG. 2 will be further explained here. A system utilizing example device 200 may receive up to 16 server blades, with each blade connector slot being identified using a 4 bit connector ID. The connector ID bits are applied to the 4-bit R-2R ladder 202. The voltage output signal BLADE_Vi of the R-2R ladder 202 at the top of the ladder is proportional to the connector ID. This voltage is buffered by a diode coupled amplifier (X1) 208 in the example shown. A comparator (X2) 212 compares the amplifier 208 output Vo to the voltage MP_Vmax existing on the midplane node. The output of the comparator 212 is used to assert a voltage M# indicating that the blade is selected as a master where the output voltage Vo of the amplifier 208 is greater than the midplane voltage MP_Vmax.

A non-limiting example of operating the device 200 may include using a 0V to 3.3V signal for connector ID input bits. Using this example input voltage produces a 4 bit resolution of 200 mV/BLADE_Vi step on the R-2R ladder 202. Setting the feedback resistor 214 (Rgain) to provide a gain of three-times the input BLADE_Vi on the amplifier 208 provides a 10V full scale MP_Vmax swing with 600 mV steps. Selecting a gain of 3 also provides good noise immunity. Of course, any other suitable gain selection is also within the scope of the disclosure.

An input differential voltage (Vo-MP_Vmax) to the comparator 212 in the present example will result in either a −0.5V or one of several positive voltages from +0.6V to +10V. The present example may use the negative voltage output from the comparator 212 to select the master blade and use the positive voltage outputs for indicating slave blades. In one non-limiting embodiment, the positive voltages may be used to further rank all other modules connected to the chassis. Thus, there may be signals indicating a succession order among all non-selected modules. While numerous circuit components may be used to implement the device 200, one option is to use low cost operational amplifiers.

In one non-limiting embodiment, a resistor 220 denoted by Roffset may be used to bias the R-2R ladder 202 away from ground to ensure that the R-2R ladder voltage is 0.6V or more and to provide a small current in the load resistor 218 Rload even for a slot ID of 0000. Maintaining a lower voltage limit provides a more stable output and reduces the need for rail to rail operational amplifiers, Continuing with the non-limiting example, the device may be used to reassign master status when a master blade is removed. The midplane voltage MP_Vmax will drop to match the blade with the next highest slot ID when the current master is removed. There are numerous ways to implementing the device such that the slot ID of the master blade and the slot ID of the next ranked slot having a blade connected to the slot are also numerically ordered, so a slot ID input that is between the slot ID of the removed master and the next ranked blade may be avoided. In this manner a 3rd device claiming ownership using the selecting device 200 is not an issue during the MP_Vmax transient from the level of the removed master to the level of the next ranked slot ID.

In one non-limiting embodiment, a hysteresis resistor Rhyst may be used to remove spurious voltages on the output M#/S of the comparator 212.

In one non-limiting embodiment, an optional filter capacitor 222 Cfltr may be used to form a resistor-capacitor (RC) low pass filter with the R-2R ladder 202 to remove high frequency noise from the input to the amplifier 208.

Figure 3:
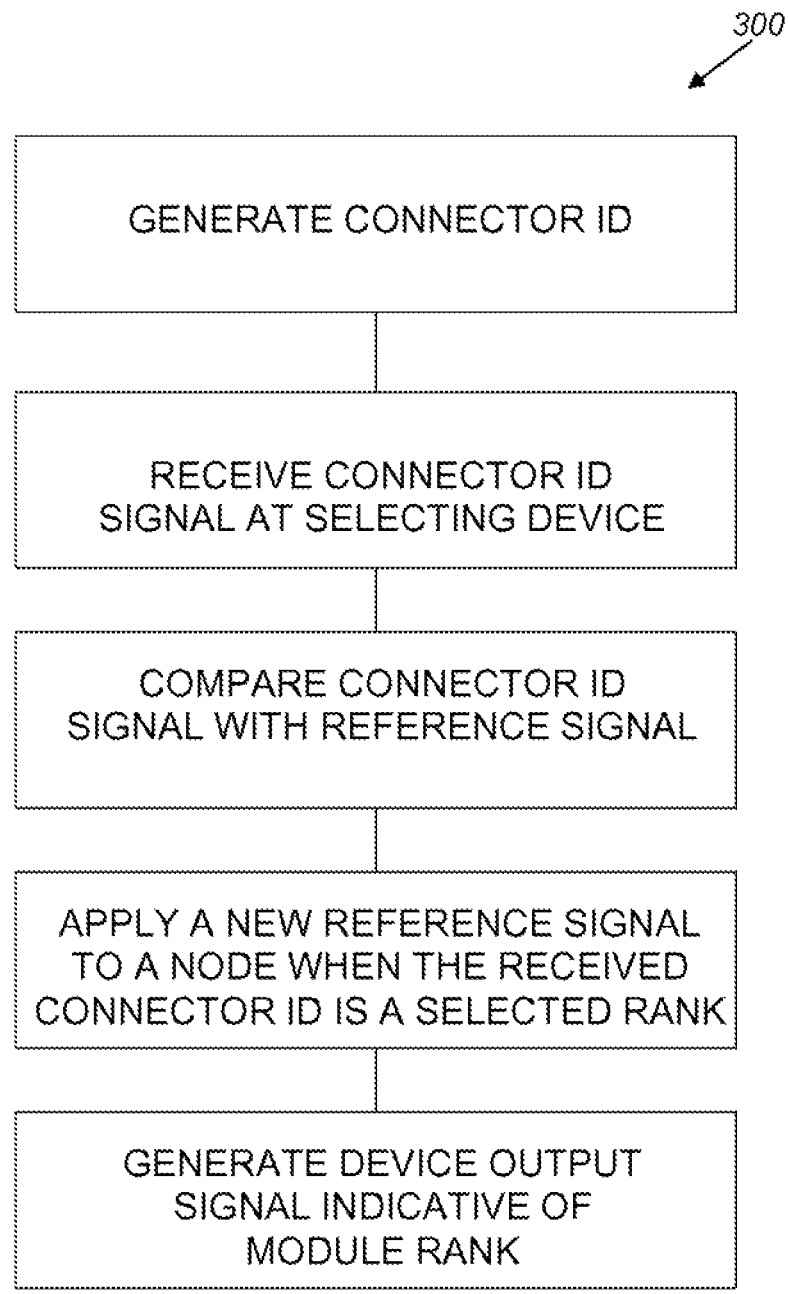
FIG. 3 illustrates a non-limiting example of a method for selecting an information handling system module according to the disclosure.

FIG. 3 is a non-limiting illustration of a method 300 for selecting an information handling system for a desired function. The method includes determining whether a module is coupled to a chassis in a connector having an associated ID ranked higher than any other connector ID having a second module coupled thereto. The method further includes selecting the module having the highest ranking connector ID for the desired function.

In one non-limiting embodiment, the method includes generating a connector ID signal when a module is coupled to a chassis connector having a connector ID associated therewith, the connector ID signal being representative of the connector ID. The connector ID signal is received at a selecting device. The method further includes automatically generating a device output signal using the selecting device, the device output signal being indicative of a module rank.

In one non-limiting embodiment, the received connector ID signal may include several binary bits. The several binary bits of the connector ID signal may be converted to an analog signal using a DAC such as the R-2R ladder 202 described above and shown in FIG. 2. The analog signal may be a voltage level that is proportional to the connector ID.

In one non-limiting embodiment, the connector ID signal is compared to a reference signal. The reference signal may be based in part on a node voltage level, where the node is electrically connected to several modules. In one non-limiting embodiment, a comparison resulting in a received connector ID being a selected rank, the selecting device may generate a new reference signal and apply the new reference signal the node. In one embodiment the node and selecting device communicate in a bi-directional manner.

In one non-limiting aspect, the module may be a network server, the device output signal being indicative of whether the network server is a master server or a slave server. As described above and shown in the example of FIG. 2, the device output signal may be used to generate a module rank based on where the modules are connected in relation to other connected modules. A second connected server is automatically asserted as a master server when a current master server is disconnected. Likewise, the servers are re-ranked by changing the module rank when the any connected server is moved from one connector location to another connector location. The change in ranking is automatic in that the ranking is performed upon any connection or disconnection of the server modules.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Such insubstantial variations are to be considered within the scope of the claims below.

Given the above disclosure of general concepts and specific embodiments, the scope of protection is defined by the claims appended hereto. The issued claims are not to be taken as limiting Applicant's right to claim disclosed, but not yet literally claimed subject matter by way of one or more further applications including those filed pursuant to the laws of the United States and/or international treaty.

What is claimed is:

1. An information handling system (IHS) comprising a plurality of server modules, the system comprising:
   a chassis having a plurality of connectors and a midplane node;
   server modules, each capable of operating in either a master or slave mode, adapted for selective connection to the chassis at a connector, the connector having an associated digital connector identifier (ID), and wherein the server modules in the chassis comprise one designated master server and at least one slave server;
   a first circuit for receiving a digital connector ID signal for each connector connected to a server module and wherein the first circuit generates an analog server module output signal related to the connector ID; and
   a second circuit for comparing the analog server module output signal to a reference signal to generate a first analog signal, wherein:
     the first analog signal is monitored at each server module;

the first analog signal serves to indicate at each server module whether or not the server module is designated as the master server; and the reference signal is configured to change upon removal of the master server.

2. The system of claim 1, wherein the first circuit generates a local server module voltage unique to each server and proportional to the connector ID.

3. The system of claim 1, wherein the first circuit includes a digital-to-analog converter (DAC) to convert at each server module the connector ID signal to a specific voltage level related to the connector ID.

4. The system of claim 3, wherein the DAC comprises an R-2R ladder.

5. The system of claim 1, wherein the first analog signal is used to rank the server modules for use as the master server.

6. An information handling system (IHS) comprising a plurality of connector coupled server modules housed in a chassis having a midplane node including one server designated as a master and at least one server designated as a slave, the system comprising:

a first circuit to receive a digital connector ID signal from each connector connected to a server module, wherein the first circuit generates an analog server module output signal representative of the connector ID; and a second circuit to compare the analog server module output signal to a reference signal and generate a first analog signal monitored at each server module, wherein the first analog signal serves to indicate at each server module of whether the server module is selected as a master, and wherein the reference signal is configured to change upon removal of the master.

7. The system of claim 6, wherein the first circuit includes a digital-to-analog converter (DAC) to convert the connector ID signal to a specific voltage level related to the connector ID.

8. The system of claim 7, wherein the DAC comprises an R-2R ladder.

9. The system of claim 6, wherein the first analog signal is used to rank the server modules for use as the master.

10. A method for dynamically ranking server modules in an information handling system comprising a plurality of connector coupled server modules housed in a chassis consisting of one designated master and at least one slave, the method comprising:

generating a digital connector ID signal;

generating an analog server module output signal, the output signal being representative of a connector ID for a connector that receives a server module;

comparing the analog server module output signals to a reference analog signal to generate a first analog signal monitored at each server module;

employing the first analog signal to indicate at each server module whether the server module is designated as a master; and automatically changing the reference signal upon removal of the master.

11. The method of claim 10, wherein the connector ID signal comprises a plurality of binary bits, the method further comprising converting the connector ID signal to an analog signal using a digital-to-analog converter (DAC).

12. The method of claim 11, wherein the analog server module output signal comprises a voltage level proportional to the binary bits.

13. The method of claim 11, wherein the DAC comprises an R-2R ladder.

14. The method of claim 10, wherein the reference analog signal is based on a voltage existing on the midplane node voltage level.

15. The method of claim 10, wherein the first analog signal is indicative of whether the server module is a master or a slave.

16. The method of claim 14, further comprising automatically asserting a second server module as the master when a first master server module is disabled based on the first analog signal.

17. The method of claim 14, further comprising automatically changing a server module rank based on a second connector ID when the server module is moved from a first connector to a second connector.

18. The method of claim 10, wherein the first analog signal is used to rank the server modules for use as the master.

* * * * *